(12) United States Patent
Cunico et al.

(10) Patent No.: US 11,889,149 B2
(45) Date of Patent: Jan. 30, 2024

(54) INTELLIGENT MITIGATION OF CONCENTRATION CONFLICTS

(71) Applicant: INTERNATIONAL BUSINESS MACHINES CORPORATION, Armonk, NY (US)

(72) Inventors: Hernan A. Cunico, Holly Springs, NC (US); Sarbajit K. Rakshit, Kolkata (IN); Jonathan Dunne, Dungarvan (IE); Martin G. Keen, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1483 days.

(21) Appl. No.: 16/128,497

(22) Filed: Sep. 11, 2018

(65) Prior Publication Data
US 2020/0084510 A1    Mar. 12, 2020

(51) Int. Cl.
*H04N 21/442* (2011.01)
*G06N 5/022* (2023.01)
*H04W 4/38* (2018.01)
*H04N 21/466* (2011.01)
*G06F 17/10* (2006.01)
*G06N 20/00* (2019.01)
*H04L 67/1396* (2022.01)

(52) U.S. Cl.
CPC ....... *H04N 21/44218* (2013.01); *G06F 17/10* (2013.01); *G06N 5/022* (2013.01); *G06N 20/00* (2019.01); *H04L 67/1396* (2022.05); *H04N 21/4667* (2013.01); *H04W 4/38* (2018.02)

(58) Field of Classification Search
CPC .......... H04N 21/44218; H04N 21/4667; G06F 17/10; G06N 5/022; G06N 20/00; G06N 5/04; H04L 67/1396; H04L 67/535; H04L 67/12; H04L 67/306; H04W 4/38; G16Y 20/40; G16Y 40/10; G06Q 10/10
See application file for complete search history.

(56) References Cited

U.S. PATENT DOCUMENTS

| 2014/0067130 A1 | 3/2014 | Pillai et al. |
| 2014/0142798 A1* | 5/2014 | Guarnizo Martinez ..................... B60W 40/09 701/23 |
| 2016/0234595 A1 | 8/2016 | Goran et al. |
| 2017/0277506 A1 | 9/2017 | Vanblon et al. |

FOREIGN PATENT DOCUMENTS

| CN | 101468630 A | * | 7/2009 | ......... B60R 21/0134 |
| IN | 201741047196 A | * | 7/2019 | |
| WO | 2017142116 A1 | | 8/2017 | |

* cited by examiner

*Primary Examiner* — Vinncelas Louis
(74) *Attorney, Agent, or Firm* — Griffiths & Seaton PLLC

(57) ABSTRACT

Embodiments for intelligent mitigation of concentration conflicts by a processor. A concentration level of a user required for one or more primary activities may be determined from one or more data sources. A distraction level indicating a possible impact to the concentration level caused by one or more secondary objects may be determined. One or more actions may be provided to mitigate the possible impact to the concentration level.

20 Claims, 7 Drawing Sheets

INTELLIGENT MITIGATION OF CONCENTRATION CONFLICTS

BACKGROUND OF THE INVENTION

Field of the Invention

The present invention relates in general to computing systems, and more particularly to, various embodiments for intelligent mitigation of concentration conflicts by a processor.

Description of the Related Art

In today's society, consumers, business persons, educators, and others use various computing network systems with increasing frequency in a variety of settings. The advent of computers and networking technologies have made possible the increase in the quality of life while enhancing day-to-day activities. Computing systems can include an Internet of Things (IoT), which is the interconnection of computing devices scattered across the globe using the existing Internet infrastructure. IoT devices may be embedded in a variety of physical devices or products. As great strides and advances in technologies come to fruition, the greater the need to make progress in these systems advantageous for efficiency and safety such as, for example, for traveling along a path or route.

SUMMARY OF THE INVENTION

Various embodiments for a system of implementing intelligent mitigation of concentration conflicts, using one or more processors, are provided. In one embodiment, by way of example only, a method for implementing intelligent mitigation of concentration conflicts, again by a processor, is provided. A concentration level of a user required for one or more primary activities may be determined from one or more data sources. A distraction level indicating a possible impact to the concentration level caused by one or more secondary objects may be determined. One or more actions may be provided to mitigate the possible impact to the concentration level.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
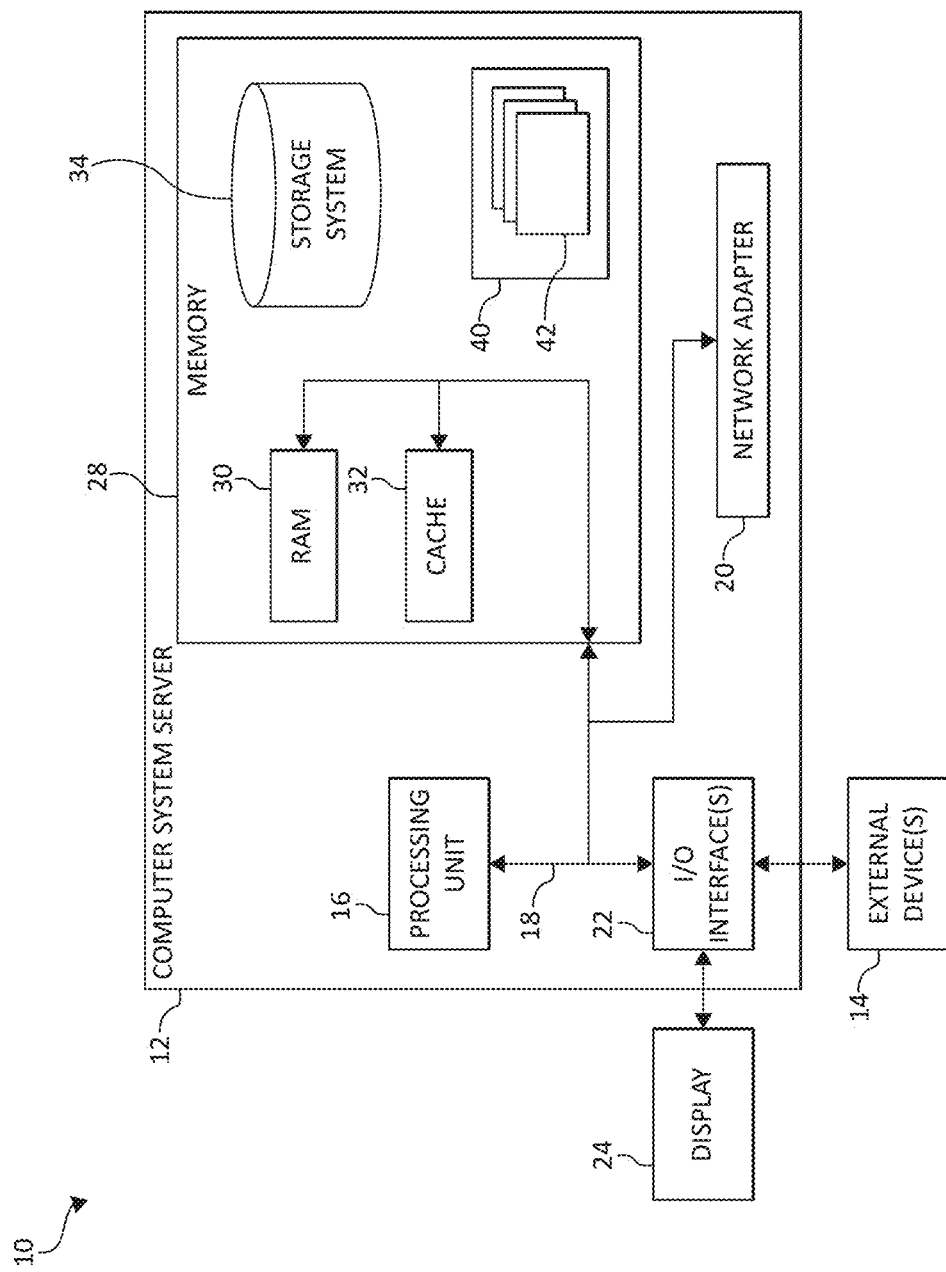
FIG. 1 is a block diagram depicting an exemplary computing node according to an embodiment of the present invention.

Computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Additionally, the Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Many of these objects are devices that are independently operable, but they may also be paired with a control system or alternatively a distributed control system such as one running over a cloud computing environment.

Furthermore, when a user is engaged in any activity that requires focus and concentration, surrounding noise and other peripheral activities can be disruptive. For example, a student ability to continue concentration and focus for preparing for final exams may be negatively affected by loud noise of others. Similar scenarios may occur in an office or home office environment, when an employee is on a sensitive task that requires full concentration and there is the cleaning crew is using a vacuum, and/or landscapers cutting the grass by an office window.

More frequently, unwanted noise may come from the IoT computing devices such as, for example, mobile phones, tablets, computers, televisions, smart speakers, etc., that may have a better level of awareness of their surroundings. Accordingly, a need exits for a system that may: 1) identify a user's need to focus (e.g., focus on a primary subject and primary activity), 2) identify surrounding persons/users and their current activities (e.g., secondary subjects and secondary activities), 3) determine if secondary subjects and/or activities affect primary subject or activity, and/or 4) take action to mitigate interference.

Thus, the present invention provides an intelligent mitigation of concentration conflicts system having one or more processors. In one embodiment, by way of example only, data gathered from a plurality of data sources relating to one or more routes and destinations may be analyzed. A concentration level of a user required for one or more primary activities may be cognitively determined from one or more data sources. In one aspect, "cognitive" may include or refer to artificial intelligence ("AI"), deep neural networks, and deep learning. A distraction level indicating a possible impact to the concentration level caused by one or more secondary objects may be cognitively determined. One or more actions may be provided to mitigate the possible impact to the concentration level. A communication may be provided to the user to alert the user of a possible impact to the concentration level upon the distraction level, the concentration level, or a combination thereof reaching a defined threshold.

In an additional aspect, present invention provides for monitoring user activities, the activity type, potential conflicts with other user activities, and consequently provide notification to mitigate such conflicts. A user environment and functionality of devices may be modified therein based on current user activity such that the modification prevents the user from distraction.

More specifically, a primary user's need to concentrate based on monitoring type of activity the users may be engaged in may be determined using one or more IoT computing devices (e.g., camera, microphone, smartphone, computer, calendar data etc.). One or more secondary subjects and associated activities may be identified based on proximity to the primary user. A distraction potential coefficient may be determined based on a prediction model. One or more secondary subjects/devices may be prevented from being disruptive to primary user/activity. A communication message may be sent and/or broadcasted for mitigation of concentration conflicts when the distraction potential reaches a first threshold and a corrective action is taken over secondary subjects when the distraction potential reaches a second threshold.

Thus, one or more advantages and benefits of an intelligent mitigation of concentration conflicts system by integrating: (i) a large variety of data sources (e.g., IoT computing devices data); (ii) cognitive operations to learn user behavior and contextual information and activities associated with the user using artificial intelligence (AI); (iii) analysis of the cognitive conditions, behavior, and activities of the user; (iv) a natural language processing (NLP) and interface that interacts and reasons with the user. For example, in one aspect, the variety of data sources may be analyzed by an NLP operation (e.g., text analysis) to data mine the relevant information from the content of the data sources in order to provide intelligent mitigation of concentration conflicts system. The NLP operation may be an instance of an NLP and artificial intelligence (AI) tools such as IBM® Watson® (IBM and Watson are trademarks of International Business Machines Corporation), which may be provided as a cloud service or as a local service.

Additional features and advantages of the intelligent mitigation of concentration conflicts system include combining streams of data from various data sources such as, for example, from publicly and commercially available data sources (e.g., weather data, pollution alert data, governmental data sources, social media feeds, crime data/statistics, traffic data sources, traffic/parking regulations), information about the user from one or more IoT devices or sensors (e.g., schedule, signs of cognitive impairment or lack of focus) such as, for example, wearable devices or sensors, and/or from data available on-board a vehicle (e.g., proximity sensors, cameras, radio frequency identification "RFID" readers, biometric sensors, wearable sensors, driving history, charge/fuel state of car, etc.). The stream of data may be processed, and the real-time flux of information enables the generation of knowledge or knowledge domain/ontology (e.g., route choice, user fatigue) and enables the intelligent mitigation of concentration conflicts, using cloud computing and/or edge computing technology.

In an additional aspect, cognitive or "cognition" may refer to a mental action or process of acquiring knowledge and understanding through thought, experience, and one or more senses using machine learning (which may include using sensor based devices or other computing systems that include audio or video devices). Cognitive may also refer to identifying patterns of behavior, leading to a "learning" of one or more events, operations, or processes. Thus, the cognitive model may, over time, develop semantic labels to apply to observed behavior and use a knowledge domain or ontology to store the learned observed behavior. In one embodiment, the system provides for progressive levels of complexity in what may be learned from the one or more events, operations, or processes.

In additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

It should be noted that one or more calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
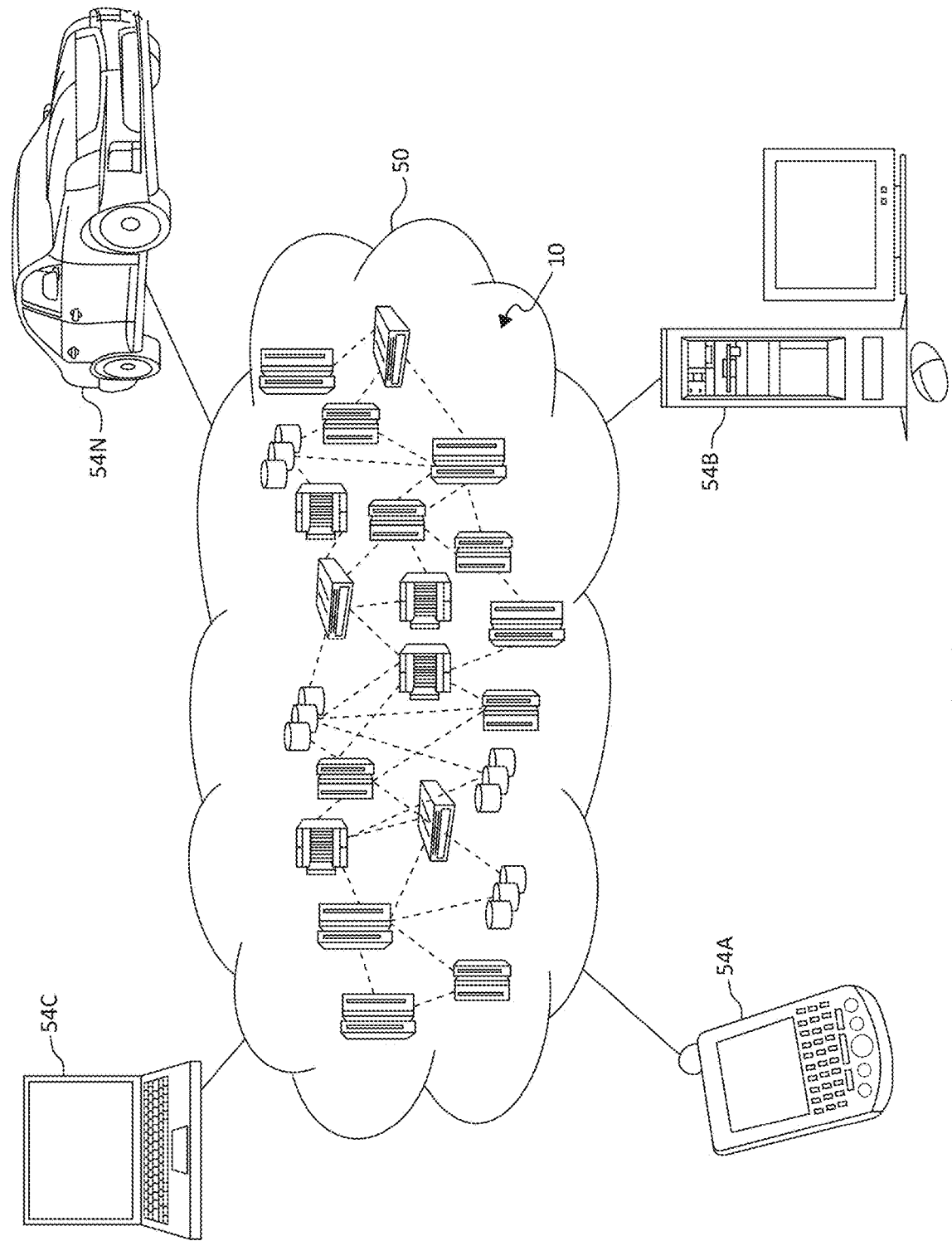
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
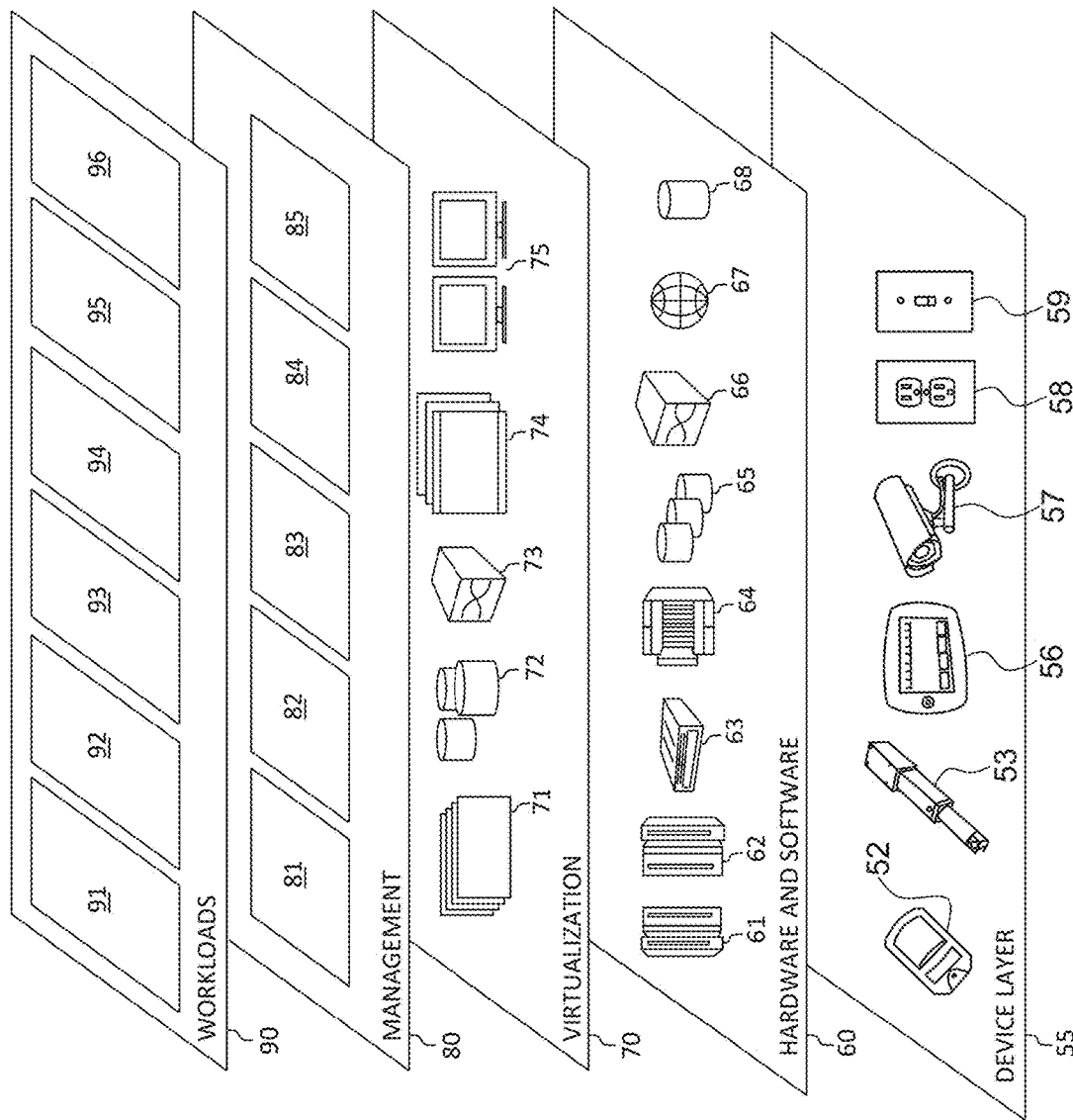
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for intelligent mitigation of concentration conflicts. In addition, workloads and functions 96 for intelligent mitigation of concentration conflicts may include such operations as data analytics, data analysis, and as will be further described, notification functionality. One of ordinary skill in the art will appreciate that the workloads and functions 96 for intelligent mitigation of concentration conflicts may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
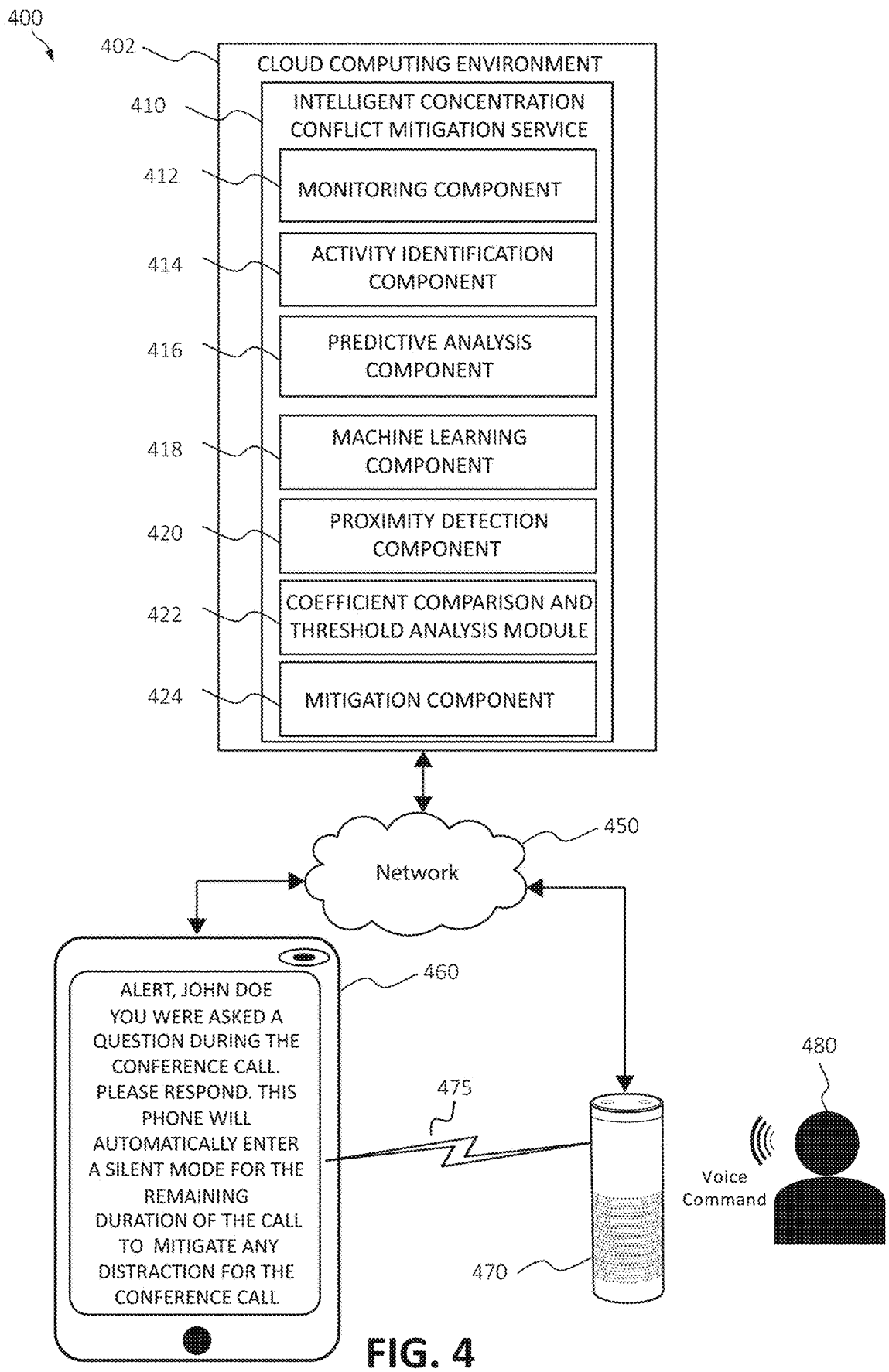
FIG. 4 is an additional block diagram depicting an exemplary functional relationship between various aspects of the present invention.

Turning now to FIG. 4, a block diagram depicting exemplary functional components 400 according to various mechanisms of the illustrated embodiments is shown. FIG. 4 illustrates a system 400 for intelligent mitigation of concentration conflicts in an IoT computing environment, such as a computing environment 402 (e.g., a cloud computing environment), according to an example of the present technology. As will be seen, many of the functional blocks may also be considered "modules" or "components" of functionality, in the same descriptive sense as has been previously described in FIGS. 1-3. With the foregoing in mind, the module/component blocks 400 may also be incorporated into various hardware and software components of a system for cognitive data curation in accordance with the present invention. Many of the functional blocks 400 may execute as background processes on various components, either in distributed computing components, or on the user device, or elsewhere.

The system 400 may include the cloud computing environment 402, an intelligent concentration conflict mitigation system 410, one or more IoT devices 470 (e.g., a digital assistant), and one or more devices such as, for example, IoT device 460 (e.g., a smartphone, desktop computer, laptop computer, tablet, and/or another electronic device that may have one or more processors and memory). The IoT devices 460 and 470, the intelligent concentration conflict mitigation system 410, and the computing environment 402 may each be associated with and/or in communication with each other, by one or more communication methods, such as a computing network 450. In one example, the IoT devices 460 and 470, the intelligent concentration conflict mitigation system 410, and the computing environment 402 may be controlled by an owner, customer, or technician/administrator associated with the computing environment 402. In another example, the IoT devices 460 and 470, the intelligent concentration conflict mitigation system 410, and the computing environment 402 may be completely independent from the owner, customer, or user of the computing environment 402.

In one aspect, the computing environment 402 may provide virtualized computing services (i.e., virtualized computing, virtualized storage, virtualized networking, etc.) to IoT devices 460 and 470. More specifically, the computing environment 402 may provide virtualized computing, virtualized storage, virtualized networking and other virtualized services that are executing on a hardware substrate. In one aspect, the one or more IoT device 470 may communicate with the IoT device 460 using network 450. Also, the IoT device 470 may communicate with the IoT devices 460 using one or more communication connections such as, for example, a Wi-Fi Internet connection 475.

As depicted in FIG. 4, the computing environment 402 may include the intelligent concentration conflict mitigation system 410. The intelligent concentration conflict mitigation system 410 may also function as a database and/or service that may store, maintain, and update data, services, and/or resources internal to and/or external to the cloud computing environment 402. The intelligent concentration conflict mitigation system 410 may store, maintain, and update device identification and authorization information and/or biometric identification (ID) data associated with the device and user profiles for one or more users, such as, for example, behavior data, activities of daily living ("ADL") data, preferred activities, calendar data, voice data, fingerprint data, retinal data, and/or other data related to a user such as, for example user 480.

In one aspect, intelligent concentration conflict mitigation system 410 may assist in providing access to and/or assist in performing one or more various types of data, services and/or resources. In one aspect, the intelligent concentration conflict mitigation system 410 may provide a monitoring component 412, an activity identification component 414, a predictive analysis component 416, a machine learning component 418, a proximity detection component 420, a coefficient comparison and threshold analysis component 422, and a mitigation component 424.

In one aspect, the monitoring component 412 may monitor the one or more primary activities and the one or more secondary objects by collecting data from the IoT computing devices 460 and/or 470.

The activity identification component 414 may identify one or more primary activities being performed and/or required to be performed by user 480. Moreover, the activity identification component 414 may also identify secondary activities the user is currently engaged in performing.

The proximity detection component 420, in association with the activity identification component 414, may identify one or more secondary activities or objects according to a defined proximity to the user 480.

The coefficient comparison and threshold analysis component 422 may determine a focus coefficient for establishing the concentration level of the user in relation to the one or more primary activities. Using the focus coefficient, the coefficient comparison and threshold analysis component 422 may cognitively determine a concentration level of the user. The coefficient comparison and threshold analysis component 422 may also determine a distraction potential coefficient from one or more characteristics of the secondary object, the one or more primary activities, one or more characteristics of the user, or a combination thereof in relation to cognitively determining a distraction level.

The predictive analysis component 416 may cognitively determine a distraction level indicating a possible impact to a concentration level of user 480 caused by one or more secondary objects.

The mitigation component 424 may provide a communication to the user 480 to alert the user of the possible impact to the concentration level (e.g., concentration level required for performing one or more primary activities) upon the distraction level, the concentration level, or a combination thereof reaching a defined threshold. The mitigation component 424 may also recommend one or more actions in the communication to the user to minimize the potential impact to the concentration level caused by one or more secondary objects. The mitigation component 424 may also dynamically employ one or more corrective actions to the one or more secondary objects to mitigate or eliminate a distraction.

In operation, the intelligent concentration conflict mitigation system 410 may be performed in three stages such as, for example, stage 1: a primary subject analysis, stage 2: a secondary subject analysis, and stage 3: coefficient analysis and mitigation.

Stage 1: Primary Subject Analysis

The monitoring component 412 may monitor and analyze a primary subject's (e.g., user 480) behavior by collecting data from one or more IoT devices such as, for example, IoT devices 460 and 470 (e.g., smart and wearable computing devices and other IoT computing devices currently being interacted with by user 480). The activity identification component 414 may identify one or more primary activities and/or one or more secondary activities.

For example, motion detection sensors in IoT devices (e.g., IoT devices 460 and/or 470) can determine current level of physically active the user 480 (e.g., "how active is the user?"). As an additional example, one or more voice activated hubs, microphones, and/or cameras can detect ambience noise as well as the user's focus area. Also, user 480 interaction with other IoT devices (e.g., computer, laptop, smartphone, tablets, etc.) for accessing and/or using a calendar may provide additional information about a schedule. Hence, the more IoT devices (e.g., IoT devices 460 and 470) involved, a higher degree and/or level of certainty is achieved determining and identifying the activity.

In one aspect, the machine learning component 418, in association with the monitoring component 412 and/or the activity identification component 414, may employ a semantic analysis on data from one or more data sources such as, for example, IoT device 460 and 470 and can also be used to understand the type of content the user is consuming. That is, the machine learning component 418 may employ and run NLP and AI tools against the data sources and learn the data content. That is, the machine learning component 418 may learn different sets of data and may use the AI to make cognitive associations or links between one or more users, activities, behaviors, relationships, responsibilities, concepts, methods, features, characteristics, schedules, events, decision elements, alternatives to a decision, alternative options/choices/events, decision criteria, concepts, suggestions and/or an underlying common activity.

Based on the machine learning analysis, the activity identification component 414 may categorize each type of activity the primary subject (e.g., user 480) is performing, such as, for example, studying, engaging in a conference call, watching television, playing, exercising, playing music, etc.

The coefficient comparison and threshold analysis component 422 may derive the focus coefficient in function of how much on task is the primary subject. There is, the coefficient comparison and threshold analysis component 422 may determine both a level of attention of the user 480 on the task but, also determining a focus coefficient for the concentration level of the user in performing the task.

The predictive analysis component 416, in association with the machine learning component 418, may analyze user 480 behavior, subject activity, frequency and type of activity and learn each of the user's patterns and creates a prediction model.

Stage 2: Secondary Subject Analysis

Similarly, as with Stage 1, stage 2 focuses around the secondary subjects and activities. Secondary subjects may be identified (e.g., via the activity identification component 414) based on a defined proximity to the primary subject. Secondary subjects and activities may also be monitored and analyzed in similar manner as describe in stage 1. Secondary subjects may be categorized. It should be noted that, as used herein, secondary subjects may be an entity (e.g., person, business, organization, etc.) and/or a computing device. A distraction-potential coefficient may be derived in function of the characteristics of the secondary subject and associated activity such as, for example, using the coefficient comparison and threshold analysis component 422.

For example, a person under the age of 18 may have a higher distraction-potential coefficient score as compared to a person over the age of 18. As an additional example, the IoT device 470 (e.g., voice activated hub) may have a lower distraction-potential coefficient as compared to IoT device 460 (e.g., phone or smart watch). One or more defined factors may be used for determining the distraction-potential coefficient such as, for example, potential sound levels, attention requirements, likelihood of interruptions, frequency of interruptions, duration of interruptions, historic data, etc.

The prediction model, which may be determined via the machine learning component 418, may be updated with one or more patterns identified around the secondary subjects.

Stage 3: Coefficient Analysis and Mitigation

When primary subject's focus coefficient and secondary subject distraction-potential coefficient reach a first threshold, a corresponding message may be communicated/broadcast to the secondary objects, which may be performed via the mitigation component 424. The communication message may include one or more details about the primary subject and the level of attention required by the current activity.

Depending on the nature of the secondary object, the message could also recommend appropriate actions to minimize distraction on primary subject. When a primary subject focus coefficient and secondary subject distraction-potential coefficient reach a second threshold, a corresponding corrective action may be taken over the secondary objects.

By way of example only, imagine the secondary subjects as objects user 480 can control electronically. For example, IoT device 460 and/or 470 may be automatically set to silent mode. A maximum volume setting may be enforced in these circumstances. Alternatively, a wireless headset may be activated and/or limited to operate as part of the corresponding corrective action. That is, the mitigation component 424 may disengage one or more features or functionalities of IoT device 460 while allowing one or more features or functionalities of IoT device 470 be employed. Using a prediction mode of the predictive analysis component 4161, the mitigation component 424 can preemptively take mitigation actions on the secondary subjects before reaching the coefficient thresholds mentioned above.

For example, assume user 480 is currently on a conference call for work using the IoT device 470 (e.g., a voice activated hub, a computing device for conference calls, and/or a telephone). However, the user 480 may be distracted from the conference call and using the IoT device 460 such as, for example, by texting another co-worker and/or a family member (each of which are not on the conference call). Thus, having performed stages 1 and 2 in relation to the conference call for the user 480, the mitigation component 424 may detect a query has been issued to user 480 from another user engaged on the conference call. The mitigation component 424 may issue the communication message to the IoT computing device 460 "Alert, John Doe. You were asked a question during the conference call. Please respond. This Phone will automatically enter a silent mode for the remaining duration of the call to mitigate any distraction for the conference call."

It should be noted that as used herein, the machine learning component 418 may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5:
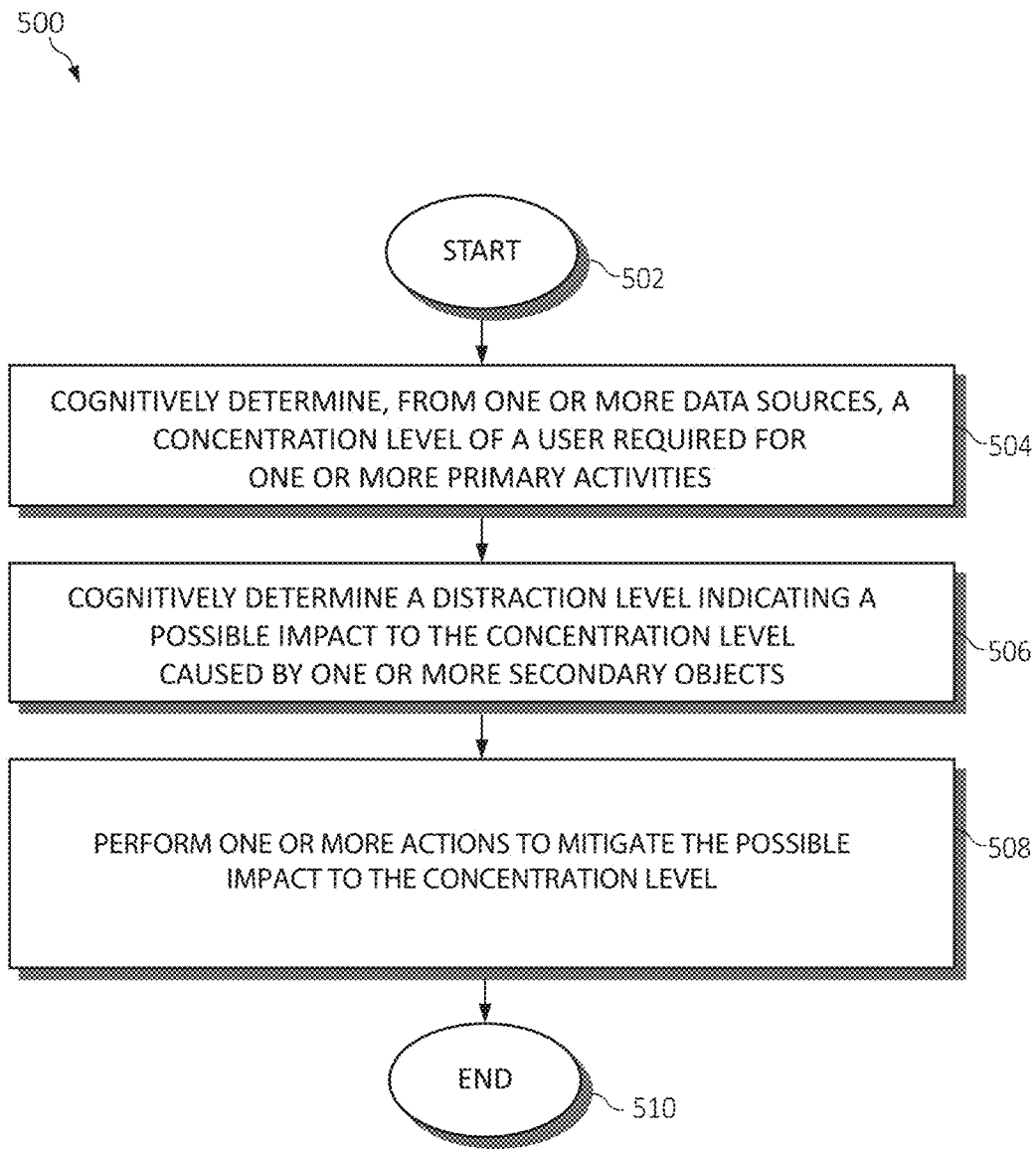
FIG. 5 is an additional flowchart diagram depicting an additional exemplary method for intelligent mitigation of concentration conflicts by a processor, again in which aspects of the present invention may be realized.

Turning now to FIG. 5, a method 500 for intelligent mitigation of concentration conflicts by a processor is depicted, in which various aspects of the illustrated embodiments may be implemented. In one aspect, each of the components, modules, and/or functions described in FIGS. 1-4 may also apply to the components, modules, and functions of FIG. 5. The functionality 500 may be implemented as a method executed as instructions on a machine, where the instructions are included on at least one computer readable medium or one non-transitory machine-readable storage medium. The functionality 500 may start in block 502.

A concentration level of a user required for one or more primary activities may be cognitively determined from one or more data sources, as in block 504. A distraction level indicating a possible impact to the concentration level caused by one or more secondary objects may be cognitively determined, as in block 506. One or more actions may be provided to mitigate the possible impact to the concentration level, as in block 508. The functionality 500 may end, as in block 510.

Figure 6A:
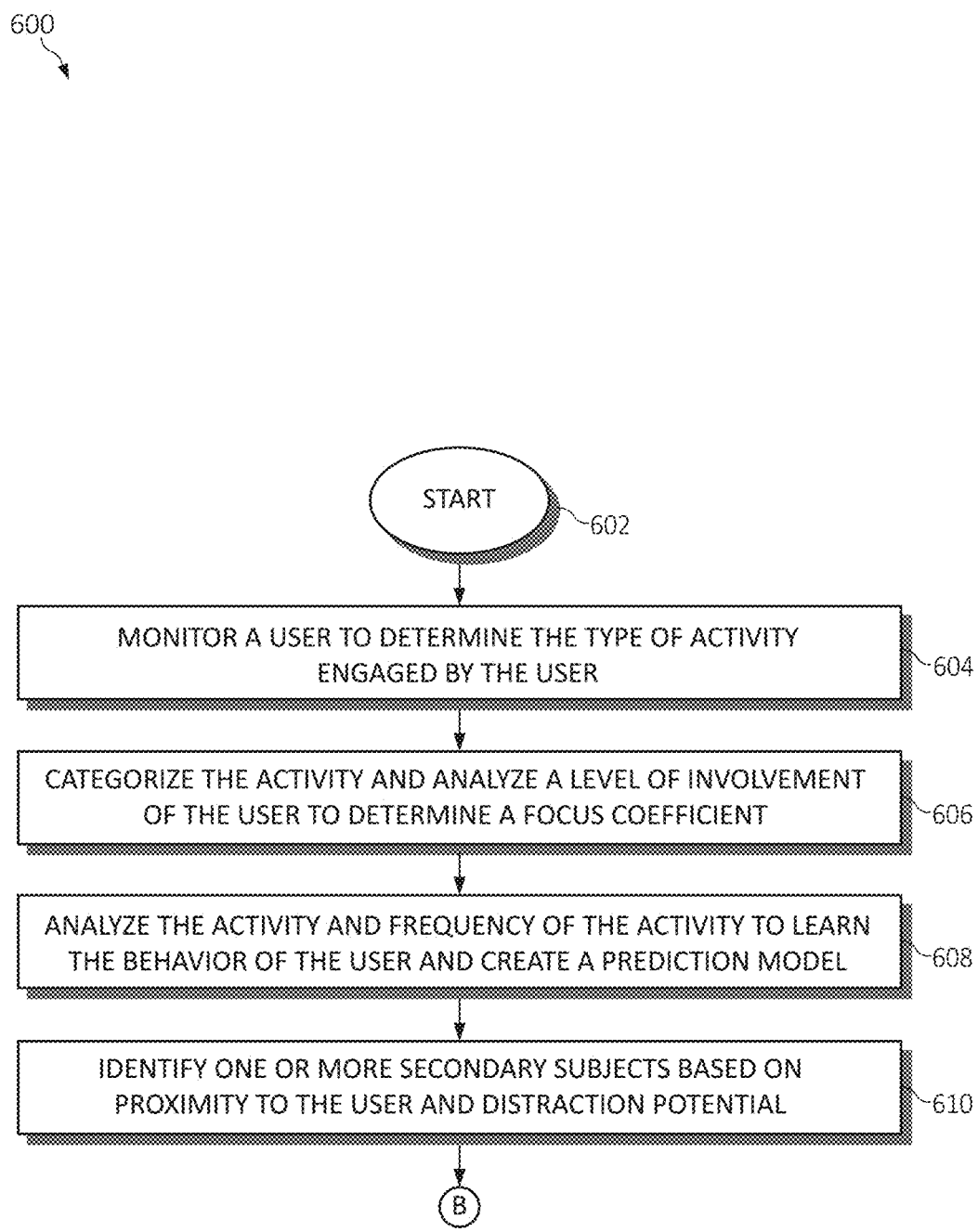
FIGS. 6A-6B is an additional flowchart diagram depicting an additional exemplary method for intelligent mitigation of concentration conflicts by a processor, again in which aspects of the present invention may be realized.
Figure 6B:
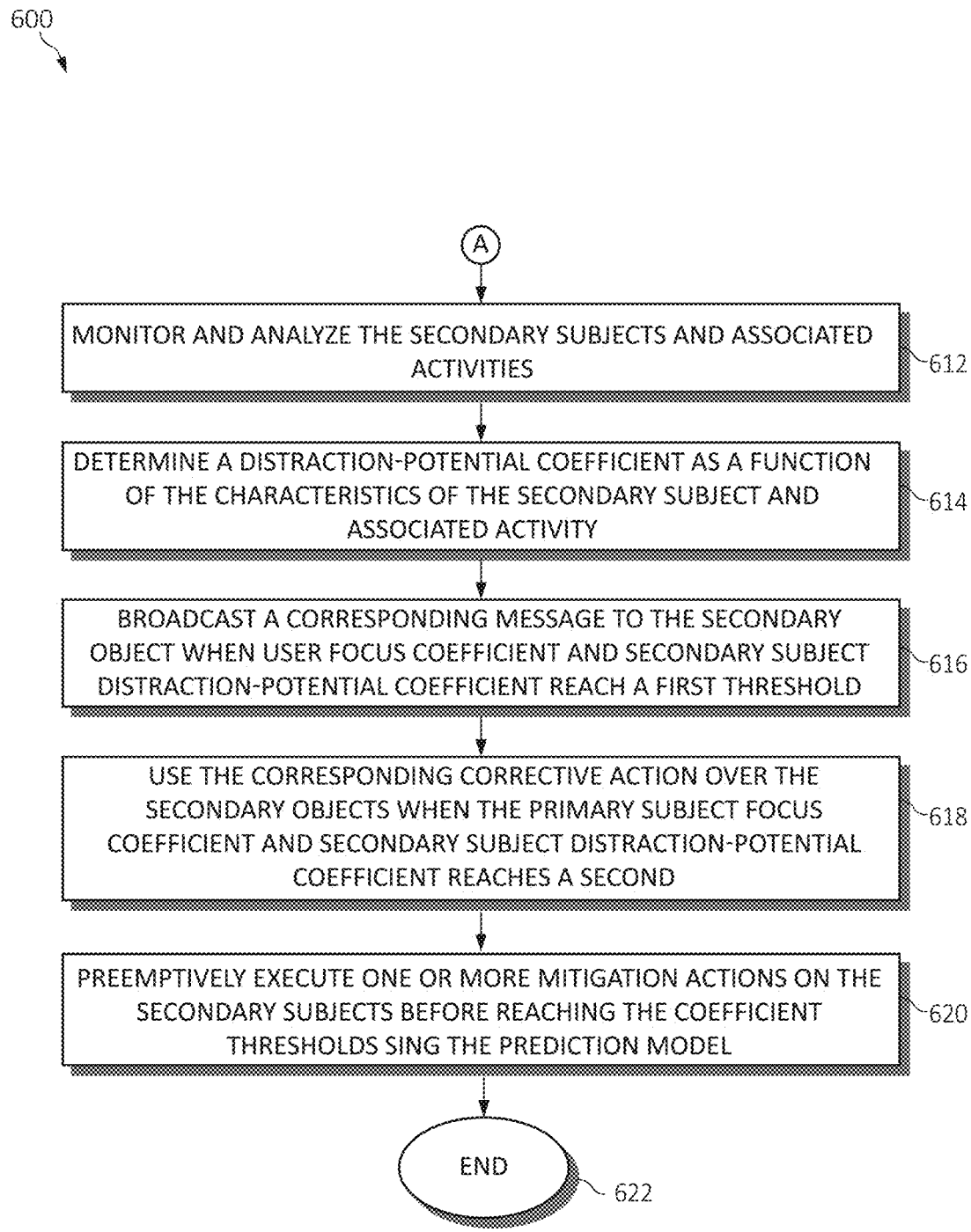

Turning now to FIGS. 6A-6B, a method 600 for intelligent mitigation of concentration conflicts by a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. The functionality 600 may start in block 602.

A user may be monitored to determine a type of activity engaged by the user, as in block 604. The activity may be categorized and a level of involvement of the user may be analyzed to determine a focus coefficient, as in block 606. The activity and frequency of the activity may be analyzed to learn the behavior of the user and create a prediction model, as in block 608. One or more secondary subjects may be identified based on proximity to the user and distraction potential, as in block 610. The secondary subjects and associated activities may be analyzed and monitored, as in block 612. A distraction-potential coefficient may be determined as a function of the characteristics of the secondary subject and associated activity, as in block 614.

A corresponding message may be broadcast/communicated to the secondary object when the user focus coefficient and secondary subject distraction-potential coefficient reach a first threshold, as in block 616. One or more corresponding corrective action may be used over the secondary objects when a primary subject focus coefficient and secondary subject distraction-potential coefficient reach a second threshold, as in block 618. Preemptively execute one or more mitigation actions on the secondary subjects before reaching the coefficient thresholds oh the prediction model, as in block 620. The functionality 600 may end, as in block 622.

In one aspect, in conjunction with and/or as part of at least one block of FIGS. 5-6, the operations of methods 500 and 600 may include each of the following. The operations of methods 500 and 600 may monitor the one or more primary activities and the one or more secondary objects by collecting data from one or more one or more Internet of Things ("IoT").

A communication to a user may be provided to alert the user of the possible impact to the concentration level upon the distraction level, the concentration level, or a combination thereof reaching a defined threshold. One or more secondary activities or objects may be identified according to a defined proximity to the user. Pursuant to cognitively determining the concentration level of the user, the further determine a focus coefficient for establishing the concentration level of the user in relation to the one or more primary activities. Pursuant to cognitively determining the distraction level, the executable instructions further determine a distraction potential coefficient from one or more characteristics of the secondary object, the one or more primary activities, one or more characteristics of the user, or a combination thereof. One or more actions may be recommended in the communication to the user to minimize the potential impact to the concentration level caused by one or more secondary objects. The operations of methods 500 and 600 may use the one or more secondary objects to mitigate or eliminate a distraction.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for intelligent mitigation of concentration conflicts by a processor, comprising:
    identifying, by a machine learning analysis using a plurality of Internet of Things (IOT) computing devices, one or more primary activities currently being performed by a user according to detection of a physical level of activity of the user in conjunction with detection of audiovisual and spatial characteristics of a focus area of the user, wherein the one or more primary activities are unknown prior to the identifying and are categorized based on detected behavior of the user, and a level of certainty in identifying the one or more primary activities is associated with a number of the plurality of IoT devices performing the identifying;
    determining, from one or more data sources, a concentration level of the user required for the one or more primary activities;
    determining a distraction level indicating a possible impact to the concentration level caused by one or more secondary objects identified by the machine learning analysis; and
    performing one or more actions to mitigate the possible impact to the concentration level.

2. The method of claim 1, further including monitoring the one or more primary activities and the one or more secondary objects by collecting data from the plurality of IoT computing devices.

3. The method of claim 1, further including identifying the one or more secondary activities or objects according to a defined proximity to the user.

4. The method of claim 1, wherein determining the concentration level of the user further includes determining a focus coefficient for establishing the concentration level of the user in relation to the one or more primary activities.

5. The method of claim 1, wherein determining the distraction level further includes determining a distraction potential coefficient from one or more characteristics of the secondary object, the one or more primary activities, one or more characteristics of the user, or a combination thereof.

6. The method of claim 1, further including recommending the one or more actions in the communication to the user to minimize the potential impact to the concentration level caused by one or more secondary objects.

7. The method of claim 1, further including dynamically employing one or more corrective actions to the one or more secondary objects to mitigate or eliminate a distraction.

8. A system for intelligent mitigation of concentration conflicts, comprising:
    one or more computers with executable instructions that when executed cause the system to:
        identify, by a machine learning analysis using a plurality of Internet of Things (IoT) computing devices, one or more primary activities currently being performed by a user according to detection of a physical level of activity of the user in conjunction with detection of audiovisual and spatial characteristics of a focus area of the user, wherein the one or more primary activities are unknown prior to the identifying and are categorized based on detected behavior of the user, and a level of certainty in identifying the one or more primary activities is associated with a number of the plurality of IoT devices performing the identifying;
        determine, from one or more data sources, a concentration level of the user required for the one or more primary activities;
        determine a distraction level indicating a possible impact to the concentration level caused by one or more secondary objects identified by the machine learning analysis; and
        perform one or more actions to mitigate the possible impact to the concentration level.

9. The system of claim 8, wherein the executable instructions further monitor the one or more primary activities and the one or more secondary objects by collecting data from the plurality of IoT computing devices.

10. The system of claim 8, wherein the executable instructions further identify the one or more secondary activities or objects according to a defined proximity to the user.

11. The system of claim 8, wherein, pursuant to determining the concentration level of the user, the executable instructions further determine a focus coefficient for establishing the concentration level of the user in relation to the one or more primary activities.

12. The system of claim 8, wherein, pursuant to determining the distraction level, the executable instructions further determine a distraction potential coefficient from one or more characteristics of the secondary object, the one or more primary activities, one or more characteristics of the user, or a combination thereof.

13. The system of claim 8, wherein the executable instructions further recommend one or more actions in the communication to the user to minimize the potential impact to the concentration level caused by one or more secondary objects.

14. The system of claim 8, wherein the executable instructions further dynamically employ one or more corrective actions to the one or more secondary objects to mitigate or eliminate a distraction.

15. A computer program product for intelligent mitigation of concentration conflicts by a processor, the computer program product comprising a non-transitory computer-readable storage medium having computer-readable program code portions stored therein, the computer-readable program code portions comprising:
    an executable portion that identifies, by a machine learning analysis using a plurality of Internet of Things (IOT) computing devices, one or more primary activities currently being performed by a user according to detection of a physical level of activity of the user in conjunction with detection of audiovisual and spatial characteristics of a focus area of the user, wherein the one or more primary activities are unknown prior to the identifying and are categorized based on detected behavior of the user, and a level of certainty in identifying the one or more primary activities is associated with a number of the plurality of IoT devices performing the identifying;

an executable portion that determines, from one or more data sources, a concentration level of the user required for the one or more primary activities;

an executable portion that determines a distraction level indicating a possible impact to the concentration level caused by one or more secondary objects identified by the machine learning analysis; and an executable portion that performs one or more actions to mitigate the possible impact to the concentration level.

16. The computer program product of claim 15, further including an executable portion that monitors the one or more primary activities and the one or more secondary objects by collecting data from the plurality of IoT computing devices.

17. The computer program product of claim 15, further including an executable portion that identifies the one or more secondary activities or objects according to a defined proximity to the user.

18. The computer program product of claim 15, further including an executable portion that:

determines a focus coefficient for establishing the concentration level of the user in relation to the one or more primary activities pursuant to determining the concentration level of the user; and determines a distraction potential coefficient from one or more characteristics of the secondary object, the one or more primary activities, one or more characteristics of the user, or a combination thereof pursuant to determining the distraction level.

19. The computer program product of claim 15, further including an executable portion that recommends one or more actions in the communication to the user to minimize the potential impact to the concentration level caused by one or more secondary objects.

20. The computer program product of claim 15, further including an executable portion that dynamically employs one or more corrective actions to the one or more secondary objects to mitigate or eliminate a distraction.

* * * * *